United States Patent Office 3,459,034
Patented Aug. 5, 1969

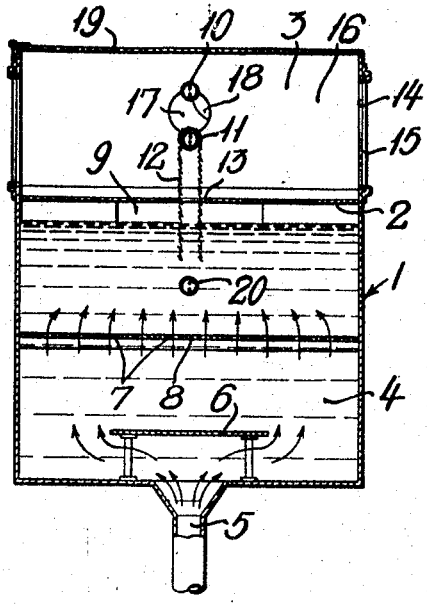
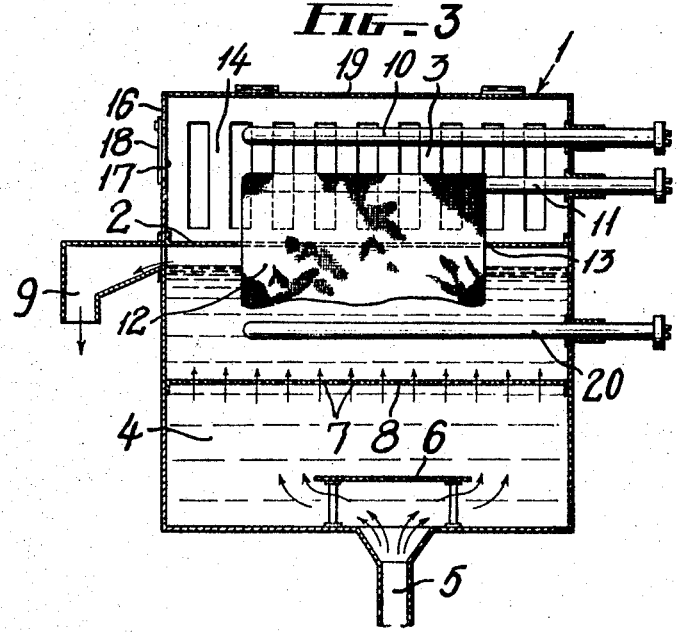

3,459,034
APPARATUS FOR MEASURING THE MOISTURE
CONTENT OF A GASEOUS SUBSTANCE IN A
HIGH TEMPERATURE CHAMBER
Hisayuki Kawaguchi, Kyoto-fu, Japan, assignor to
Kabushiki Kaisha Ichikin Kogyosha, Kusatsu-shi,
Shiga-ken, Japan
Filed May 6, 1968, Ser. No. 726,698
Claims priority, application Japan, Nov. 1, 1967,
42/69,830
Int. Cl. G01n 31/06
U.S. Cl. 73—29      8 Claims

ABSTRACT OF THE DISCLOSURE

A casing having a water reservoir continuously supplied with water and wet and dry bulb thermometers in a measuring chamber of the casing which is supplied with a sample of a gas surrounding the casing whose moisture content is to be measured.

Brief summary of the invention

This invention relates to apparatus for measuring the moisture content of a gaseous substance in a high temperature chamber at atmospheric pressure, for example, in a heat treatment chamber such as a drying chamber for textile fabrics.

There is known a measuring apparatus in which a sampling chamber having a dry bulb thermometer and a wet bulb thermometer is positioned externally of the high temperature chamber, and the gaseous substance to be measured within the chamber is conveyed to the sampling chamber while being cooled to a temperature below 100° C. and above its dew point. The gaseous substance is cooled to a temperature below 100° C. so that water in a reservoir for the wet bulb thermometer within the sampling chamber will not boil, and at the same time the temperature is above the dew point thereof to avoid condensation and consequent measurement error. The requirement to regulate the temperature of the gaseous substance in such a range is very difficult and troublesome and often impossible.

An object of the present invention is to provide a measuring apparatus which avoids the above requirements.

Another object of the invention is to provide a measuring apparatus which is directly placed in the chamber containing the gas whose moisture content is to be measured.

According to the invention, the measuring apparatus comprises a casing which is adapted for being directly positioned within the gaseous substance in the high temperature chamber. The casing contains means for passage thereinto of the surrounding gaseous substance. A wet bulb thermometer and a dry bulb thermometer are disposed in the casing and a water reservoir is disposed within the casing for supplying the wet bulb thermometer with water. A water supply means is provided for the reservoir to keep the water therein cooled and below its boiling point.

Preferably a partition is placed in the casing to divide the casing into a measuring chamber and the water reservoir. The thermometers are disposed in the measuring chamber and the gas is supplied from outside the casing into said measuring chamber.

Brief description of the drawing

FIGURE 2 is a sectional view taken along line II—II in FIG. 1, FIGURE 3 is a sectional view taken along line III—III in FIG. 1.

Detailed description

Figure 1:
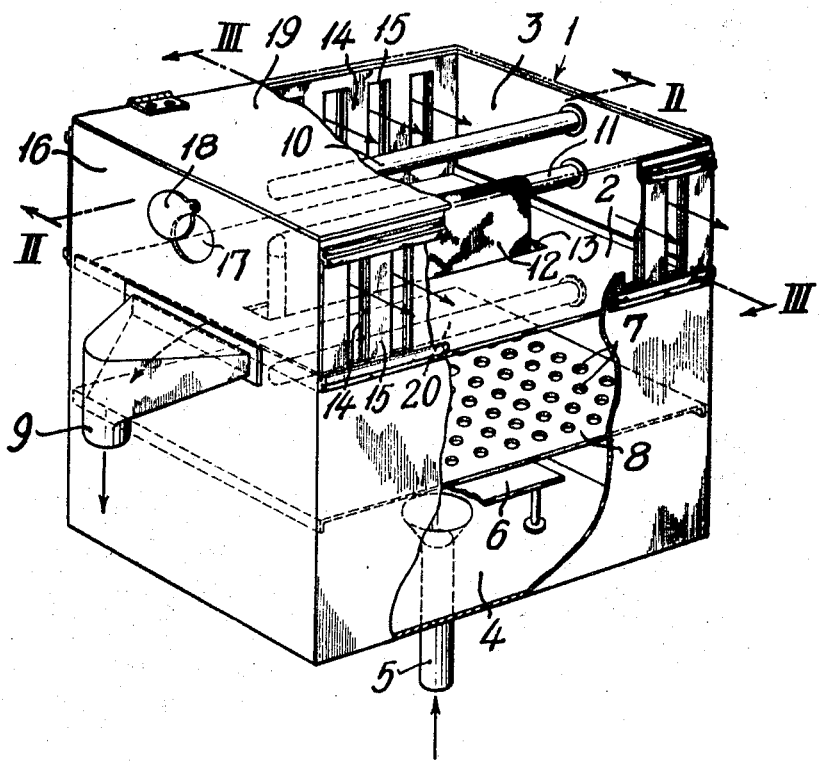
FIGURE 1 is a perspective view, partly broken away, of one embodiment of the present invention.

In the drawing there is shown a casing 1 divided by a horizontal partition wall 2 into an upper detecting chamber 3 and a lower water reservoir 4. The reservoir 4 has a water supply opening 5 at the bottom thereof. Above the opening 5 is an obstruction plate 6 for decreasing the flow speed of the water supplied at the water supply opening 5. Additionally, above the plate 6 is a plate 8 having a large number of holes 7 for uniformly distributing the supplied water, whereby the temperature in the vicinity of a gauze 12 is kept substantially constant. The excess water supplied is allowed to overflow through a discharge outlet 9 in the side surface of the casing 1.

In the detecting chamber 3 is a dry bulb thermometer 10 and a wet bulb thermometer 11. The wet bulb portion of the wet bulb thermometer 11 is covered by the gauze 12, and the lower ends of the gauze 12 are immersed in the water reservoir 4 through a slit 13 formed in the partition wall 2. The gauze serves to keep the wet bulb portion continuously wet.

The chamber 3 has opposite side walls 14 with spaced apertures therein and laterally slidable doors 15 controlling the degree of opening of the apertures. The gaseous substance to be measured passes through the chamber 3, the flow speed of the gaseous substance being controlled by the doors 15. The gaseous substance may flow at a speed, for example, lower than 1 m./sec. An opposite side wall 16 of chamber 3 is provided with an opening 17 for the insertion of an anemometer for measuring the flow speed of the gaseous substance. The opening 17 is provided with a cover 18 which can be opened and closed as desired. The chamber 3 has an upper cover 19 which can be opened and closed to enable the gauze 12 to be periodically replaced to insure proper water supply to the wet bulb thermometer 11. Numeral 20 denotes a thermometer for measuring the water temperature in the vicinity of the gauze 12 within the reservoir 4.

Figure 4:
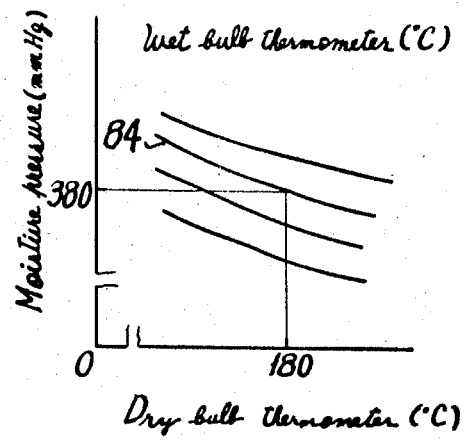
FIGURE 4 is a diagram showing the relationship of dry bulb temperature, wet bulb temperature and moisture pressure.

The casing 1 is positioned directly within a high temperature chamber (for example, 100° C. to 250° C.). Water is continuously supplied to the water supply inlet 5 while being withdrawn at outlet 9, so that the water in the reservoir is kept at a predetermined temperature below its boiling point and not allowed to be boiled. Meanwhile, the gaseous substance to be measured is allowed to flow into the detecting chamber 3 at a speed below a predetermined speed (1 m./sec.) and the temperature of the gaseous substance may be read on the dry bulb thermometer 10 and the wet bulb thermometer 11. A diagram relating dry bulb temperature, wet bulb temperature and moisture pressure (previously obtained experimentally) is shown in FIG. 4, and in the case, for example, in which the wet bulb temperature is 84° C. and the dry bulb temperature is 180° C., there is obtained a pressure of 380 mm. Hg. From this value can be obtained the moisture content in the high temperature chamber which is at atmospheric pressure.

Thus, according to the present invention, the detecting chamber is adapted for being supplied with a gaseous substance to be measured at a predetermined flow speed, and the detecting chamber is provided with dry bulb and wet bulb thermometers. The water reservoir for the wet bulb is provided below the detecting chamber and is supplied with cold water so that the water will not boil within the high temperature chamber. Thus, the apparatus may be provided directly within the high temperature chamber for measuring purposes. Accordingly, it is not necessary that the gaseous substance to be measured be cooled to a predetermined temperature below 100° C. as in the conventional method wherein measuring is effected by removing the gaseous substance and feeding it into a sampling chamber. The construction is thus extremely simplified and it becomes possible to measure the moisture content of even a gaseous substance which is nearly saturated.

What is claimed is:

1. Apparatus for measuring the moisture content of a gaseous substance in a high temperature chamber which is at atmospheric pressure, said apparatus comprising a casing adapted for being directly positioned within the gaseous substance in the high temperature chamber, a partition in said casing dividing the same into a measuring chamber and a reservoir for water, a plurality of apertures in opposite walls of the casing in said measuring chamber for the passage into said measuring chamber of the gaseous substance, a wet bulb thermometer in said measuring chamber, a dry bulb thermometer in said measuring chamber, means for supplying the wet bulb thermometer with water from said reservoir, and means for supplying the reservoir with water to keep the water therein cooled and below its boiling point.

2. Apparatus as claimed in claim 1 wherein said means for supplying the wet bulb thermometer with water is a water absorbent member which is in contact with the wet bulb thermometer and is immersed in the water in said reservoir.

3. Apparatus as claimed in claim 1 comprising a discharge outlet for water from said reservoir which limits the level of the water in said reservoir.

4. Apparatus as claimed in claim 1 comprising slidable doors in said opposite walls of the casing for regulating the degree of opening of the apertures.

5. Apparatus as claimed in claim 4 wherein said casing has a further wall in said measuring chamber with a closable opening therein.

6. Apparatus as claimed in claim 4 wherein said casing includes a pivotable upper cover which can furnish access to the interior of the measuring chamber.

7. Apparatus as claimed in claim 1 wherein said partition is horizontal and the measuring chamber is above the reservoir, said means for supplying the reservoir with water comprising a water supply conduit which opens into said reservoir at the bottom of the casing.

8. Apparatus as claimed in claim 7 comprising a horizontal plate in said reservoir above the supply conduit, said plate being immersed in the water in said reservoir and having apertures for the passage of water therethrough.

References Cited

UNITED STATES PATENTS

| | | | |
|---|---|---|---|
| 1,430,937 | 10/1922 | Bundrick | 73—338 |
| 2,260,245 | 10/1941 | Wappner | 73—338 |
| 3,253,465 | 5/1966 | Miller | 73—338 |

RICHARD C. QUEISSER, Primary Examiner

J. K. LUNSFORD, Assistant Examiner

U.S. Cl. X.R.

73—338